(12) United States Patent
Hoelsaeter

(10) Patent No.: US 6,339,522 B1
(45) Date of Patent: Jan. 15, 2002

(54) MAGNETIC DATA TRANSFER SYSTEM WITH DYNAMIC HEAD-TO-TAPE ALIGNMENT

(75) Inventor: Hävard Hoelsaeter, Oslo (NO)

(73) Assignee: Tandberg Data ASA, Oslo (NO)

( * ) Notice: Subject to any disclaimer, the term of this patent is extended or adjusted under 35 U.S.C. 154(b) by 0 days.

(21) Appl. No.: 09/568,547

(22) Filed: May 11, 2000

(51) Int. Cl.$^7$ ................................................. G11B 5/56
(52) U.S. Cl. ....................................................... 360/291
(58) Field of Search ............................... 360/291, 291.1, 360/291.2, 291.3, 291.5, 291.6, 291.7, 291.8, 291.9, 292

(56) References Cited

U.S. PATENT DOCUMENTS

| | | | |
|---|---|---|---|
| 5,311,390 A | * | 5/1994 | Nayak et al. ............... 360/291 |
| 5,438,469 A | * | 8/1995 | Rudi .......................... 360/291 |
| 5,862,014 A | * | 1/1999 | Nute .......................... 360/291 |
| 5,978,188 A | * | 11/1999 | Kaaden et al. .............. 360/291 |
| 6,075,678 A | * | 6/2000 | Saliba ........................ 360/291 |

* cited by examiner

*Primary Examiner*—Allen Cao
(74) *Attorney, Agent, or Firm*—Schiff Hardin & Waite

(57) ABSTRACT

A magnetic data transfer system includes a tape drive with a magnetic tape cartridge insertable in a cartridge receptacle in the tape drive, and a magnetic data transfer head having at least two data transfer elements disposed in succession along a transport direction of the tape drive. The vertical position of the magnetic data transfer head in the tape drive is adjustable along a vertical adjustment direction. The data transfer elements monitor a monitored feature of the magnetic tape, such as a tape edge, a reference track or a servo track, and generate respective signals which are supplied to a controller circuit. The controller circuit, dependent on a difference between these signals, generates a control signal which is supplied to an adjustment mechanism. The adjustment mechanism acts either on an element of the tape cartridge, or a tape guide path internally in the magnetic data transfer system, or on the mount for the magnetic data transfer head, or on a tape guide structure which defines a tape transport path within the cartridge, so as to always maintain the difference between the signals as close to zero as possible, thereby also maintaining the transport direction of the magnetic tape perpendicular to the vertical adjustment direction of the magnetic data transfer head.

6 Claims, 3 Drawing Sheets

MAGNETIC DATA TRANSFER SYSTEM WITH DYNAMIC HEAD-TO-TAPE ALIGNMENT

BACKGROUND OF THE INVENTION

1. Field of the Invention

The present invention is directed to a magnetic tape drive, of the type which receives a magnetic cartridge and which contains a magnetic read/write head.

2. Description of the Prior Art

Many types and structures of tape drives are known, which receive a magnetic tape cartridge therein so that the magnetic tape contained in the cartridge, when inserted into the tape drive, is positioned in front of a magnetic read/write head, or is at least positioned adjacent the read/write elements thereof.

Typically in such a magnetic tape cartridge, the tape is guided past an opening in the cartridge by tape guides mounted on the cartridge base plate. When the cartridge is properly inserted in the drive, this opening exposes a portion of the tape for engagement with the magnetic head to permit information to be written onto, and information to be read from, the magnetic tape as it is transported past the magnetic head. Data are stored on the magnetic tape in the form of a series of magnetic polarity reversals, in parallel tracks. Obviously, for a given tape width (width being measured in a direction perpendicular to the direction of tape transport), more data can be stored on a magnetic tape if the tracks are positioned as closely adjacent to each other as possible. Such close positioning (tight packing) of the tracks, however, requires high demands for correctly initially positioning the cartridge within the drive, and maintaining a precise position of the magnetic tape in the cartridge relative to the read/write elements of the magnetic head, so that data are not written into, or read from, an incorrect track due to misalignment between the tape and the magnetic head. The magnetic head is typically mounted on a mechanism such as a threaded, rotatable spindle, which allows the magnetic head to be moved vertically upwardly and downwardly in a direction along the tape width to read or write from track-to-track, or to position the magnetic head adjacent a specified track.

Many techniques and structures are known in the art for initially positioning the tape cartridge in the tape drive either in an exactly reproducible manner, or in an initially adjustable manner, so that when the tape drive begins operation, a reference or starting position of the tape cartridge, and thus of the magnetic tape itself, is known and can be entered into, or read by, the system which is used to move the position of the magnetic head during read and write operations. Such cartridge positioning, even if adjustable, is completed before the drive begins to operate, and this is status during operation. Even when the tape cartridge is accurately positioned at known reference points within the tape drive, however, the magnetic tape, which is slightly movable within the tape cartridge due to tolerances associated with the reels and tape guides, may nevertheless be canted or slanted as it is transported past the read/write elements of the magnetic head. Given closely packed data tracks on the magnetic tape, the slanting head-to-tape (misalignment) may be severe enough to cause writing or reading errors. Moreover, the mechanism which is used to vertically position the magnetic head also has tolerances and slippage associated therewith, which may also contribute to misalignment between the recording elements and the tape.

Moreover, in order to position the magnetic head, and thus the read/write elements thereof, at a selected track position along the width of the tape, reference signals are typically obtained from the tape itself in order to provide servo-control for positioning the magnetic head. For this purpose, the top or bottom of the tape can be monitored, and the magnetic head can then be positioned at a specified distance from the monitored edge at which the desired data track is expected to be located, given proper alignment between the magnetic head and the magnetic tape. Another known technique is to use a servo-track on, or embedded in, the magnetic tape for the same purpose, or one of the data tracks themselves can be arbitrarily designated as a reference track, and used for the same purpose. Typically, the magnetic head includes multiple read/write elements, and one of these read/write elements is used to monitor the servo-track, the reference track, or the tape edge, and one or more further read/write elements is used to conduct a read or write operation while appropriate positioning of the magnetic head takes place in a servo-loop. Again, if the tape is slanted as it passes by the magnetic head the servo loop may cause the magnetic head to be positioned at a track which is next to the intended track, or several tracks away if the misalignment is severe.

In tape cartridges of the type having tape guides therein, even when the cartridge is manufactured to very exacting tolerances, some small degree of play between the tape and the tape guides must still exist, so that the tape can move freely, at high speed, over the guides. It is therefore not possible, nor desirable, to mechanically restrain the tape to a sufficient degree to ensure that misalignment will not occur. Since every tape cartridge will have a slightly different amount of play inherent therein, many tape guides include elaborate adjustment mechanisms, or electronic adjustment procedures, which must be undertaken every time a new tape cartridge is inserted in a tape drive to arrive at the aforementioned static reference position. While such adjustment procedures are being conducted, the system is not available for data reading or data recording. Moreover, such conventional adjustment usually takes the form of trying to precisely adjust the position of the tape cartridge itself within the drive, under the assumption that if and when the tape cartridge is properly positioned, the tape itself then also will be properly positioned, or at least at a known position. It is also known to adjust the tape guides within the tape cartridge, relative to the base plate of the cartridge, or the tape guides within the tape drive relative to the head, for the same purpose. For the reasons discussed above, however, this conventional assumption is not correct, and there will likely always be some small amount of unknown deviation of the tape transport path from an "ideal" transport path which would be precisely parallel to the cartridge base plate.

SUMMARY OF THE INVENTION

It is an object of the present invention to provide a magnetic data transfer system wherein head-to-tape misalignment is avoided, or at least significantly minimized, with a simple mechanical structure and without complicated electronics.

It is a further object of the present invention to provide a magnetic data transfer system wherein head-to-tape misalignment is avoided, or significantly minimized, by detecting misalignment directly at the magnetic tape itself.

As used herein, the phrase "magnetic data transfer" means reading and/or writing information onto and from a magnetic storage medium, such as a magnetic tape. Thus, a "magnetic data transfer head," as that term is used herein, means a head having electromagnetic, magnetoresistive or some other type of elements which are capable of reading data from a magnetic tape and writing data onto a magnetic tape, and encompasses the types of heads which are capable of performing both operations simultaneously, known as "reading while writing" operation.

The above objects are achieved in accordance with the principles of the present invention in a magnetic data transfer system having a tape drive having a cartridge receptacle therein and also having a magnetic data transfer head disposed therein in a mount which allows vertical adjustment of the position of the magnetic data transfer head along a vertical adjustment direction. The magnetic data transfer system also includes a magnetic tape cartridge containing a magnetic tape which is received in the cartridge receptacle in the tape drive. When in this receptacle, the magnetic tape in the cartridge is movable by the tape drive in a transport direction past the magnetic data transfer head. The magnetic data transfer head is a two channel head, with each channel having a data transfer element, these data transfer elements being successively disposed along said transfer direction and monitoring a feature of the magnetic tape as the magnetic tape moves past the magnetic data transfer head. The monitored feature may be a position of a tape edge, a reference data track, or a servo track. Each of the data transfer elements, and thus each of the two channels, generates a signal dependent on monitoring of this feature. The magnetic data transfer system also includes an adjustment mechanism which mechanically engages either the cartridge in the receptacle, or the mount for the magnetic data transfer head, or tape guiding structure within the magnetic data transfer system or any combination thereof. A controller circuit is electrically connected to the adjustment mechanism for supplying a control signal thereto which operates the adjustment mechanism. The controller circuit is supplied with the respective signals from the two channels, and the controller circuit operates in the manner of a feedback circuit to control the alignment mechanism, via the aforementioned control signal, so as to minimize any difference between the respective signals from the channels. Any difference between the respective signals from the channels results from head-to-tape misalignment, since the aforementioned data transfer elements are disposed in succession along the tape transport direction. Therefore, minimizing the difference between these respective channel signals results in the adjustment mechanism operating to maintain the aforementioned vertical adjustment direction perpendicular to the tape transport direction, thereby avoiding or significantly minimizing any head-to-tape misalignment which may arise.

In an embodiment, the adjustment mechanism can include a height adjustment device which is disposed to engage and move magnetic head arrangement relative to the cartridge base plate, or to move the cartridge base plate relative to the head arrangement, dependent on the control signal received from the controller circuit. Which of these components is engaged and moved depends on which is mounted in a fixed manner, the non-fixed component being the one that is engaged and moved. The inventive principle is the same regardless of which component is moved. For example, the cartridge base plate in this embodiment can be inserted into the tape drive so that one end, or one side, thereof is disposed at a fixed azimuthal reference point, and the opposite end or side of the cartridge base plate is movable by the height adjustment device. The operation of the height adjustment device causes the cartridge base plate to pivot at the fixed azimuthal reference point, thereby slightly adjusting the angle of the tape in the cartridge relative to the magnetic head, so as to avoid or minimize any head-to-tape misalignment.

In another embodiment, the adjustment mechanism operates on tape guides, such as are adjustably mounted in the magnetic data transfer system (drive), and which define a tape transport path relative to the magnetic data transfer head. The guides can be vertically (azimuthally) moved relative to the magnetic head arrangement, for example.

In another embodiment, the adjustment mechanism can operate on the rotatable spindle on which the magnetic head is mounted. Typically, the aforementioned vertical adjustment of the magnetic head is accomplished by a threaded spindle, which proceeds through a threaded bore at a rear of the magnetic head. The threaded spindle is rotatable so that the magnetic head is thereby raised or lowered along the vertical adjustment direction dependent on the amount of rotation of the threaded spindle. The ideal vertical orientation of the threaded spindle is referred to as the zenith direction, and in this embodiment the adjustment mechanism includes a spindle adjustment device which acts on the spindle to move the spindle through positive and/or negative angles relative to the zenith direction. The spindle adjustment device can act on one side of the spindle, and the other side of the spindle can be acted on by a spring. Such a spring is commonly present in any event, as an adjustable zenith guide. The bottom end of the spindle is pivotably mounted in the tape drive to allow movement thereof at angles relative to the zenith.

DESCRIPTION OF THE PREFERRED EMBODIMENTS

Figure 1:
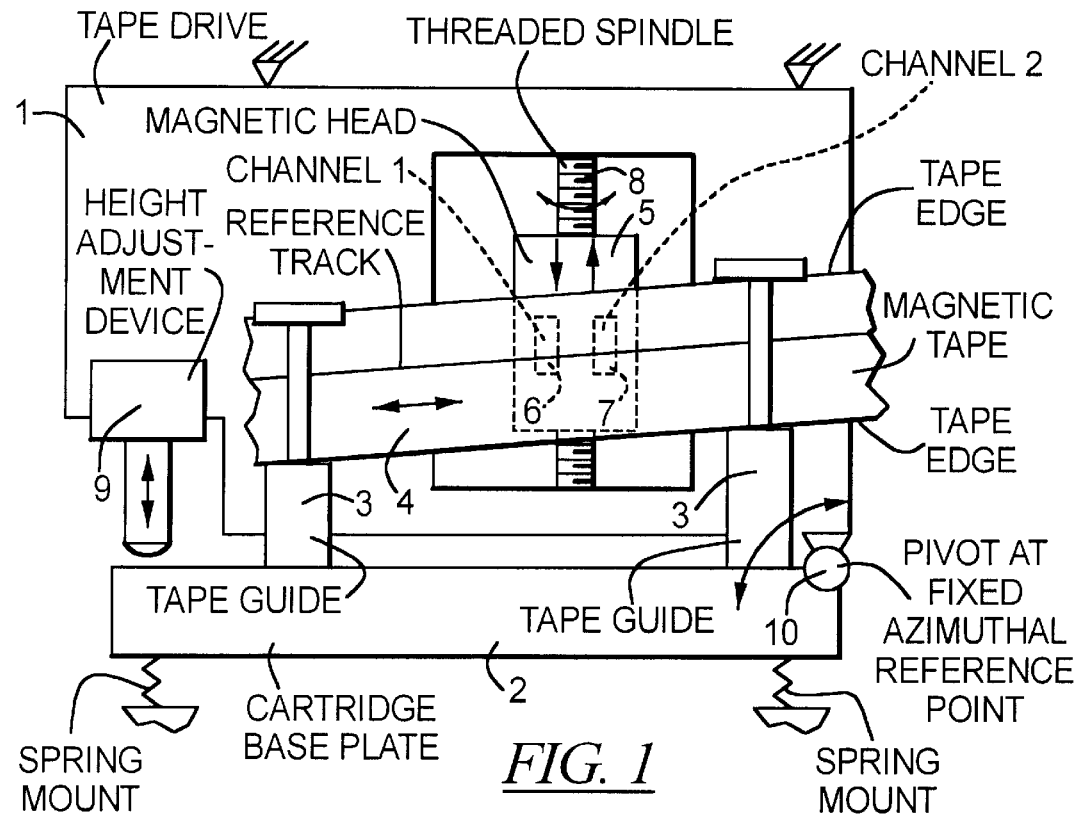
FIG. 1 is a schematic illustration of a first version of a first embodiment of a magnetic data transfer system constructed and operating in accordance with principles of the present invention.

The magnetic data transfer system shown in FIG. 1 includes a tape drive 1 having a tape cartridge receptacle in which a tape cartridge is removably insertable. The tape cartridge is conventional, and only the cartridge base plate 2, the tape guides 3 and the magnetic tape 4 thereof are shown in FIG. 1.

When the tape cartridge is inserted into the tape drive 1, the magnetic tape 4 is adjacent a magnetic data transfer head (hereinafter "magnetic head") 5. The magnetic head 5 has at least two channels, designated channel 1 and channel 2, and channel 1 has a data transfer element 6 and the channel 2 has a data transfer element 7. The data transfer elements 6 and 7 are of any suitable conventional type and are disposed in succession along a transport direction of the magnetic tape 4. The transport direction is indicated by the double arrow within the magnetic tape 4.

As is also conventional, the magnetic head 5 is mounted within the tape drive 1 so as to be vertically adjustable, along the directions indicated by the double arrow contained in the magnetic head 5. This is accomplished by a threaded spindle which is mounted in the tape drive 1 and which proceeds through a threaded bore at a rear of the magnetic head 5. As the threaded spindle is rotated in one of the directions indicated by the curved double arrow, the magnetic head 5 will move upwardly or downwardly. The threaded spindle is connected to a conventional head positioning system (not shown) for effecting this vertical adjustment.

In FIG. 1, the magnetic tape 4 is shown in an exaggerated manner as being slanted relative to the vertical adjustment direction of the magnetic head 5. If the channel 1, for example, is being operated as a channel which monitors a reference track for the purpose of providing a servo signal for controlling vertical positioning of the magnetic head 5, it can be seen in FIG. 1, that the slanting of the magnetic tape 4 relative to the vertical adjustment direction (head-to-tape misalignment) may result in the data transfer element 6 for channel 1 detecting a vertical position of the reference track which is not the same as the vertical position which the reference track will have when it passes the data transfer element 7 of channel 2. Given closely packed parallel data tracks on the magnetic tape 4, this may result in data transfer errors because the head positioning system is conventionally designed based on the assumption that the reference track will proceed perpendicularly to the vertical adjustment direction, but this is not the case due to the aforementioned misalignment.

The above example has been described in the context of using a reference track for generating a servo signal for the head positioning system, however, it is equally true for head positioning systems which monitor other features of the magnetic tape 4, such as a tape edge thereof, or a dedicated servo track thereof.

As described above, conventionally, head-to-tape misalignment is attempted to be avoided or minimized by precisely positioning the tape cartridge in the tape drive 1 at fixed reference points, and the head positioning system "knows" the locations of these fixed reference points and proceeds therefrom to determine all other positions, such as the location of a data track which is intended to be used for data transfer with the magnetic head 5. Some systems, as also noted above, allow a certain amount of adjustment of the position of the cartridge after insertion, instead of employing completely fixed reference points, however, in these systems, after the adjustment occurs, the same information is supplied to the head positioning system as is used in a fixed point reference system. These conventional systems do no take into account the fact that even after such adjustment occurs, the magnetic tape itself within the cartridge may not be precisely at the assumed position, due to the necessary play or tolerance which must exist between the magnetic tape 4 and the tape guides 3 to allow unimpeded transport of the magnetic tape 4 at high speeds. These conventional types of systems, therefore, statically determine, or try to compensate for, any misalignment which may exist, but thereafter no further adjustments are made to correct for misalignment. These conventional systems, therefore, are not dynamic systems.

The magnetic transfer system shown in FIG. 1 is a dynamic system which allows for continuous monitoring of any head-to-tape misalignment which may arise during operation, and allows such misalignment to be dynamically compensated during operation, so that the misalignment is either avoided or significantly minimized. In the embodiment shown in FIG. 1, and as explained in more detail below in conjunction with FIG. 3, mechanical adjustment to compensate for any misalignment which arises is accomplished by a height adjustment device 9, which has a plunger, threaded rod, or some other type of displaceable element which engages the cartridge base plate 2. The cartridge base plate 2 is disposed within the cartridge receptacle of the tape drive 1 so as to have one end thereof as a fixed azimuthal reference point 10, and the cartridge base plate 2 is permitted to pivot slightly relative to this reference point 10. The opposite end of side of the cartridge base plate 2 is disposed to interact with the movable element of the height adjustment device 9. The cartridge base plate 2, if necessary, may be spring biased from below in order to maintain engagement at all times with the movable element of the height adjustment device 9.

Figure 2:
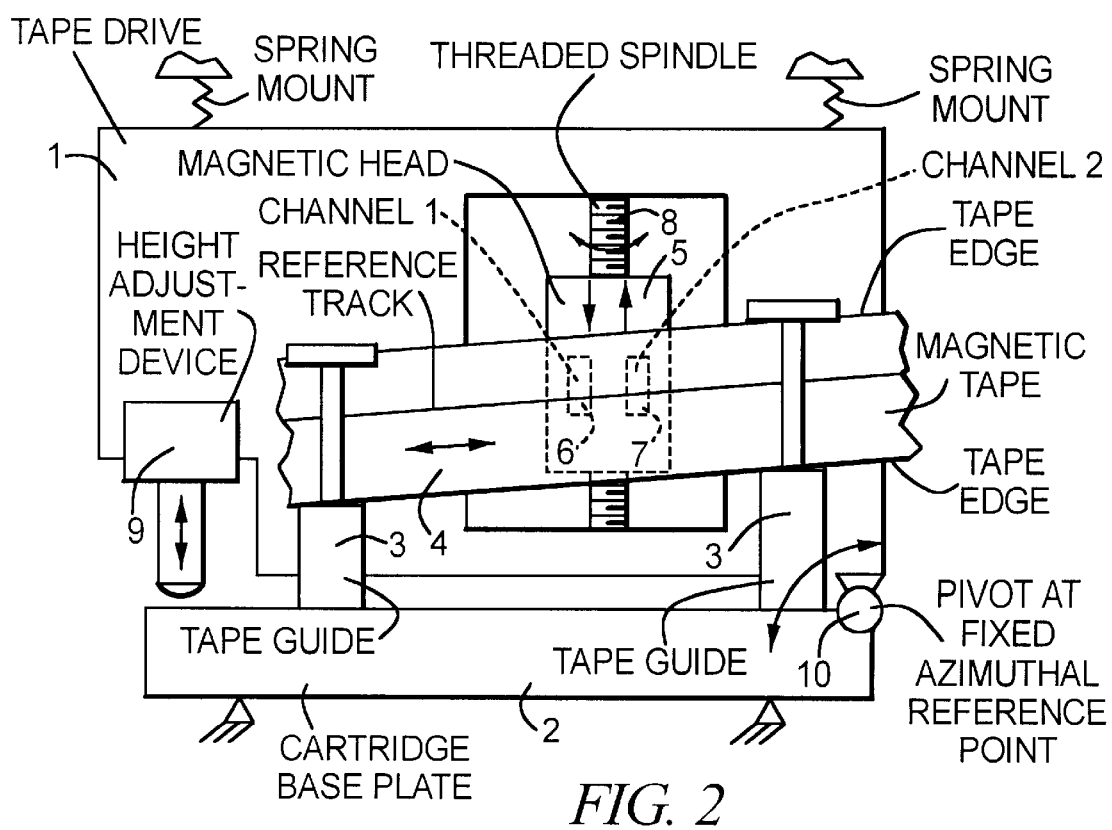
FIG. 2 is a schematic illustration of a second version of the first embodiment of a magnetic data transfer system constructed and operating in accordance with principles of the present invention.

FIG. 2 shows a further embodiment wherein the height adjustment device 9 moves the tape drive 1, i.e., the overall head arrangement thereof, which is spring-mounted in this embodiment instead of the cartridge base plate 2. All other components of FIG. 2 are as already described in connection with FIG. 1.

Figure 3:
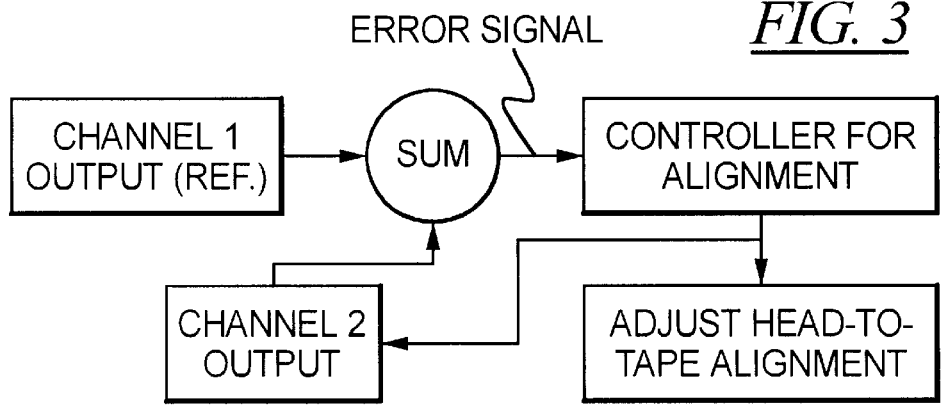
FIG. 3 is a flowchart illustrating the basic operation of the magnetic data transfer system in accordance with the invention.

As shown in FIG. 3, during operation the output signal from one of the channels of the magnetic head 5, the output from the channel 1 in this exemplary embodiment, serves as a reference signal which is supplied to a summing unit in a controller circuit. The output of the other channel, in this embodiment the output from channel 2, is also supplied to this summing unit as a negative quantity, so that an error signal is emitted from the output of the summing unit, which represents the difference, if any, between the output from channel 1 and the output from channel 2. The error signal is supplied to a controller for alignment, which generates a control signal therefrom which is supplied, in the embodiments of FIGS. 1 and 2, to the height adjustment device 9. This control signal causes the height adjustment device 9 to displace the movable element thereof in order to displace the cartridge base plate 2 in the embodiment of FIG. 1 on the head arrangement in the embodiment of FIG. 2, so that the cartridge base plate 2 is slightly pivoted relative to the reference point 10 to avoid or significantly minimize any misalignment. If a difference between the respective outputs from channel 1 and channel 2 exists, this will be due to head-to-tape misalignment of the type shown in exaggerated form in FIG. 1. By adjusting the position of the cartridge base plate 2 or the head arrangement in order to make this difference, if it exists, as close to zero as possible, this results in the transport direction being made as close to perpendicular as possible relative to the vertical adjustment direction of the magnetic head 5. This means that the reference track, or whatever monitored feature of the magnetic tape 4 is employed, also perpendicular to the vertical adjustment direction of the magnetic head 5. The ensures that, for each data track on the magnetic tape 4, it will pass by the data transfer head 6 at the same vertical position at which it passes by the data transfer element 7 (or vice versa, given an opposite transport direction). Reading and writing errors due to head-to-tape misalignment are therefore precluded.

Figure 4:
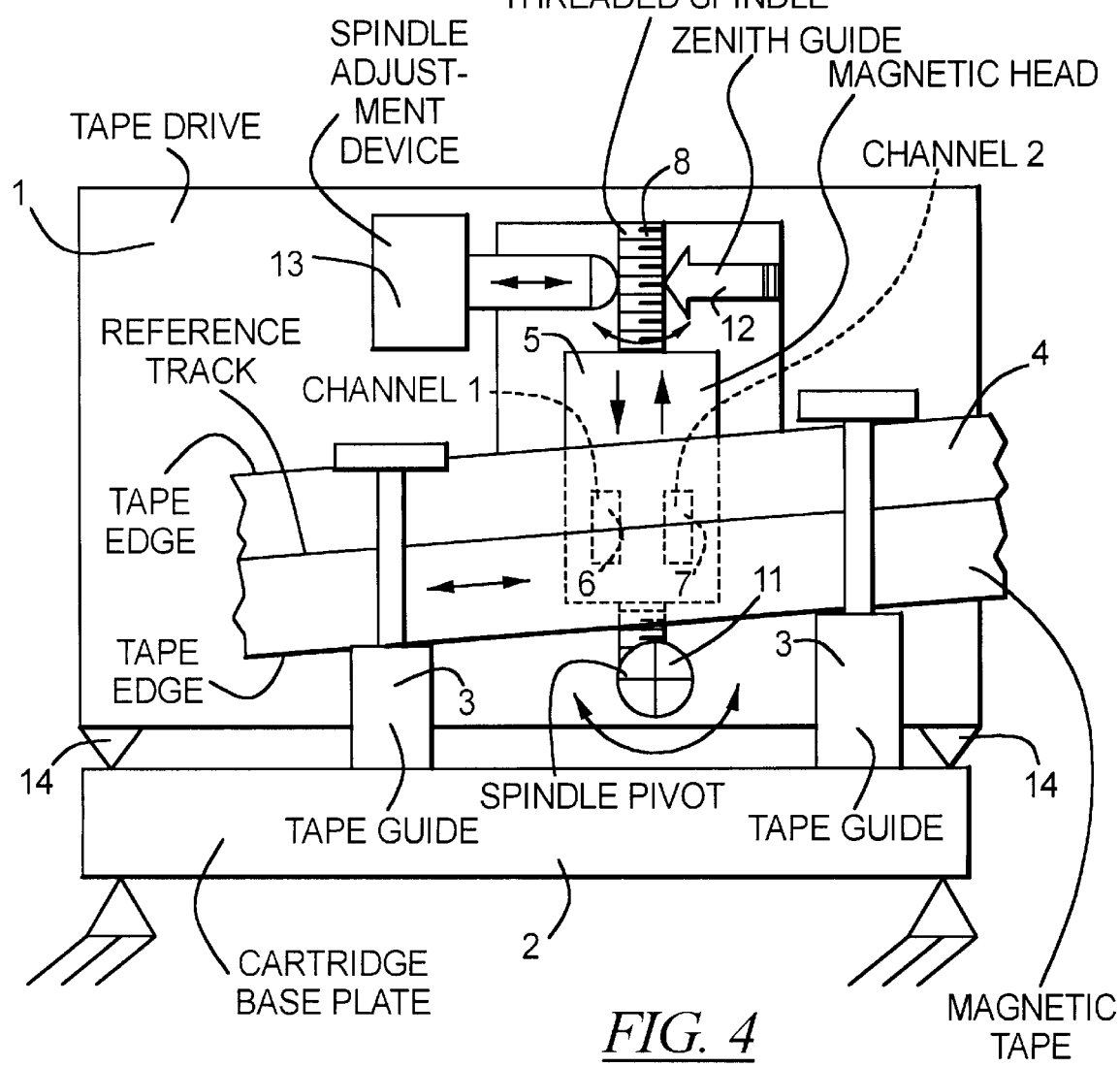
FIG. 4 is a schematic illustration of a second embodiment of a magnetic data transfer system constructed and operating in accordance with principles of the present invention.

In the further embodiment of the magnetic transfer system shown in FIG. 4, elements which are the same as elements already described in connection with FIG. 1 are provided with the same reference numerals, and need not be described again. In the embodiment of FIG. 4, the tape drive 1 and the cartridge base plate 2 are in mechanical contact at several locations, two of which are schematically as reference points 14. In the embodiment of FIG. 4, instead of adjusting the position of the cartridge base plate 2, the position of the magnetic head 5, relative to an ideal zenith direction, is adjusted by a spindle adjustment device 13. The same control signal as described in connection with FIG. 2 is supplied to the spindle adjustment device 13. The bottom end of the threaded spindle 8 is mounted in the tape drive 1 at a spindle pivot 11, which allows tilting of the threaded spindle 8 in the directions of the curved arrow shown immediately below the spindle pivot 11. For the purpose of zenith adjustment, it is conventional to provide a zenith guide 12, which allows precise adjustment, such as by a set screw, of the zenith position of threaded spindle 8 and thus the zenith position of the vertical position of the magnetic head 5. This zenith guide 12 can be employed in the inventive system at a side of the threaded spindle 8 opposite to the spindle adjustment device 13 to continually urge the threaded spindle 8 against the movable element of the spindle adjustment device 13.

Figure 5:
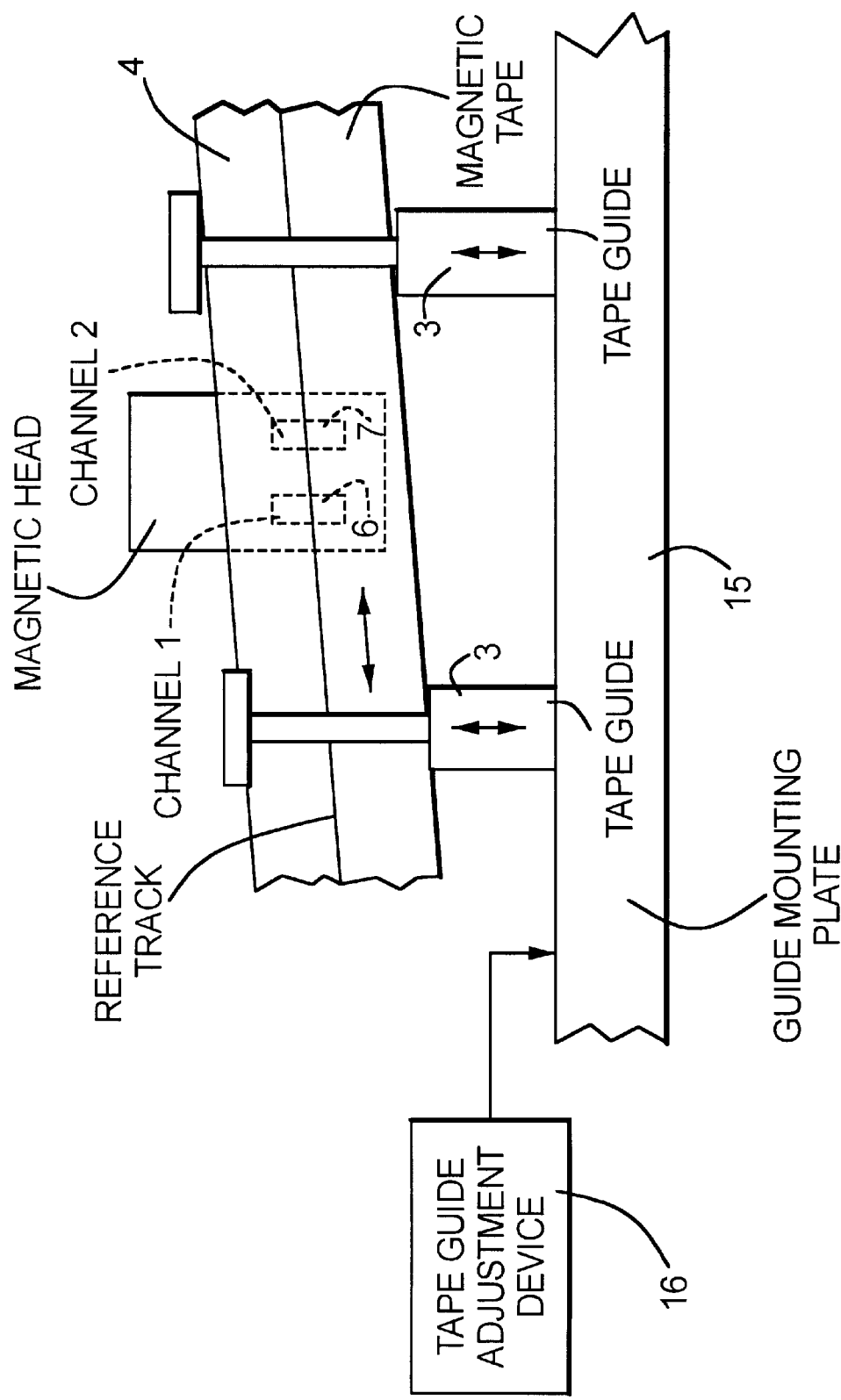
FIG. 5 is a schematic illustration of a third embodiment of a magnetic data transfer system constructed and operating in accordance with the principles of the present invention.

FIG. 5 shows a further embodiment wherein only certain components described in the previous embodiment have been repeated, but the surrounding structure not shown in FIG. 5 is substantially the same as in FIGS. 1, 2 and 3. In the embodiment of FIG. 5, the tape guides 3 are adjustably mounted so as to be movable in the azimuthal direction, as indicated by the double arrows within the respective tape guides 3. The tape guides 3 are mounted on a guide mounting plate 15. The guide mounting plate 15 may, in fact, be the cartridge base plate, or it may be a separate plate which is mounted to the cartridge base plate within the cartridge, or it may be a separate plate which is mounted within the magnetic data transfer system, and which objective is to guide the tape relative the head (for cartridges without base plate and no internal tape guides in the cartridge). Adjustment of the tape guides 3 can take place either by moving the guide mounting plate 15, or by moving the tape guides 3 relative to the guide mounting plate 15. Both types of mechanisms are well-known to those of ordinary skill in the art. The embodiment of FIG. 5 employs a tape guide adjustment device 16 for effecting this azimuthal adjustment of the tape guides 3, either by directly acting on the guide mounting plate 15 (or the cartridge base plate, if the cartridge base plate forms the guide mounting plate 15) or by acting on the tape guides 3 directly to move them relative to the guide mounting plate 15. The control signals supplied to the tape guide adjustment device 16 are obtained in the same manner as described in connection with the previous embodiments.

It is also possible to provide both the height adjustment device 9 and/or the spindle adjustment device 13 and/or the tape guide adjustment device together in the same tape drive, however, in most circumstances only one such adjustment device will be needed.

Although modifications and changes may be suggested by those skilled in the art, it is the intention of the inventor to embody within the patent warranted hereon all changes and modifications as reasonably and properly come within the scope of his contribution to the art.

I claim as my invention:

1. A magnetic data transfer system comprising:
  a tape drive having a tape cartridge receptacle therein and having a magnetic data transfer head disposed therein in a mount which vertically adjusts said magnetic data transfer head in a vertical adjustment direction;
  a magnetic tape cartridge containing a magnetic tape movable by said tape drive in a transport direction past said magnetic data transfer head when said magnetic tape cartridge is inserted in said cartridge receptacle, said tape having a monitored feature selected from the group consisting of a tape edge, reference data track and a servo track;
  said magnetic data transfer head having a first channel with a first data transfer element and a second channel having a second data transfer element, said first and second data transfer elements being disposed in succession along said transport direction;
  said first and second data transfer elements respectively separately and independently monitoring said monitored feature as said magnetic tape moves past said magnetic data transfer head, and said first and second channels generating respective signals dependent on monitoring of said monitored function by the respective first and second data transfer elements;
  an alignment mechanism mechanically engaging at least one of said cartridge in said receptacle and said mount; and
  a controller circuit electrically connected to said adjustment mechanism and to said first and second channels, and being supplied with the respective signals from said first and second channels, said controller circuit generating a control signal for said adjustment mechanism to operate said adjustment mechanism to minimize any difference between the respective signals from said first and second channels and thereby also maintaining said vertical adjustment direction perpendicular to said transport direction.

2. A magnetic data transfer system as claimed in claim 1 wherein said magnetic tape cartridge has a cartridge base plate and wherein said cartridge receptacle has a fixed azimuthal reference point at which a first portion of said cartridge base plate is pivotably disposed when said magnetic tape cartridge is inserted in said cartridge receptacle, and wherein said adjustment mechanism comprises a height adjustment device having a movable element acting on a further portion of said cartridge base plate to cause said cartridge base plate to pivot relative to said fixed azimuthal reference point.

3. A magnetic data transfer system as claimed in claim 1 wherein said cartridge receptacle has a fixed azimuthal reference point at which said cartridge base plate is fixedly disposed at a fixed azimuthal reference point when said cartridge base plate is disposed in said cartridge receptacle, and wherein at least said mount for said magnetic data transfer head is movably disposed within said tape drive, and wherein said height adjustment device has a part fixed to said tape drive and a movable element acting on said cartridge base plate to cause said mount to pivot relative to said fixed azimuthal reference point.

4. A magnetic data transfer system as claimed in claim 1 wherein said mount comprises a spindle in said tape drive engaging said magnetic data transfer head, said spindle having an end which is pivotably mounted in said tape drive at a spindle pivot allowing movement of said spindle relative to a zenith direction of said tape drive, and wherein said adjustment mechanism comprises a spindle adjustment device having a movable element engaging said spindle to displace said spindle relative to said zenith direction by pivoting said spindle at said spindle pivot.

5. A magnetic data transfer system as claimed in claim 1 wherein said magnetic tape cartridge comprises a tape guide structure disposed for guiding said magnetic tape along a transport path past said magnetic data transfer head when said tape cartridge is inserted in said cartridge receptacle, and wherein said adjustment mechanism mechanically engages said tape guide structure and azimuthally displaces at least a portion of said tape guide structure to azimuthally adjust said transport path.

6. A magnetic data transfer system as claimed in claim 5 wherein said tape guide structure comprises a guide mounting plate, a first tape guide mounted on said guide mounting plate and a second tape guide mounted on said guide mounting plate, said magnetic tape being guided by said first and second tape guides along said transport path, and wherein said adjustment mechanism mechanically engages at least one of said first tape guide, said second tape guide, and said guide mounting plate.

* * * * *